US005666709A

United States Patent [19]

Suzuki

[11] Patent Number: 5,666,709

[45] Date of Patent: Sep. 16, 1997

[54] BALLOON CLIP FASTENING DEVICE

[75] Inventor: Takahisa Suzuki, Funabashi, Japan

[73] Assignee: Suzuki Latex Industry Co., Ltd., Chiba, Japan

[21] Appl. No.: 537,093

[22] Filed: Sep. 29, 1995

[30] Foreign Application Priority Data

Nov. 18, 1994 [JP] Japan .................................... 6-284721

[51] Int. Cl.$^6$ .............................. B23P 11/00; B23P 19/00

[52] U.S. Cl. ........................... 29/243.56; 29/505; 29/509; 29/238; 29/235

[58] Field of Search ................................ 29/235, 243.56, 29/238, 505, 509, 513, 283.5

[56] References Cited

U.S. PATENT DOCUMENTS

| | | | |
|---|---|---|---|
| 2,055,440 | 9/1936 | Johns . | |
| 2,682,054 | 6/1954 | Lindstrom | 29/509 |
| 3,503,119 | 3/1970 | Seitz, Jr. et al. | 29/509 |
| 4,548,201 | 10/1985 | Yoon | 29/235 |
| 4,694,554 | 9/1987 | McGrath | 29/235 |
| 5,035,040 | 7/1991 | Kerrigan et al. | 29/505 |
| 5,473,539 | 12/1995 | Shimizu et al. | 364/424.05 |

*Primary Examiner*—Timothy V. Eley
*Assistant Examiner*—Lee Wilson
*Attorney, Agent, or Firm*—Koda and Androlia

[57] ABSTRACT

A balloon clip fastening device having a V-shaped groove and a clip receiving hole which is continuous to the bottom of the groove. A balloon clip with the stem of a balloon placed between a pair of clamping members of the balloon clip is inserted into the V-shaped groove and then moved inside the groove so that the balloon clip is closed while being moved, thus holding and closing the balloon. The closed balloon clip is taken out of the clip receiving hole.

4 Claims, 4 Drawing Sheets

BALLOON CLIP FASTENING DEVICE

BACKGROUND OF THE INVENTION

1. Field of the Invention

The present invention relates a device for fastening a balloon clip to an inflated balloon.

2. Prior Art

The stem portion of an ordinary balloon through which a balloon is inflated with gas such as air, etc. and of a yo-yo balloon inflated with water is closed by stretching and tying the stem itself. The balloons are also closed by tightly binding the stem with a rubber band, string, etc. Thus, the closing of the opening tube portion of the balloon is not a very easy job.

SUMMARY OF THE INVENTION

The inventor of the present application focused on a V-shaped balloon clip that securely closes the stems of inflated balloons. The V-shaped balloon clip comprises a pair of clamping members hingedly connected at end portions thereon so as to make a V-shape. The tip ends of the clamping members are tightly engaged with each other when the stem of a balloon is placed between the clamping members and the clamping members are closed, thus tightly holding the stem of the inflated balloon between the clamping members.

A patent application is filed together with the present application for the invention of such a balloon clip made by the inventor of the present application.

If this type of balloon clip can be easily fastened to the balloons in a smooth, reliable and easy fashion, it would be possible to close the stems of large quantities of balloons very efficiently, which would be convenient. As a result of this research, the inventor found that a use of tapered surfaces in a V-shaped groove into which such a V-shaped clamping clip is inserted is the most efficient way of fastening balloon clips to balloons.

Accordingly, the object of the present invention is to provide a balloon clip fastening device which allows a smooth, quick and easy operation of fastening clips to the stems of inflated balloons.

The object of the present invention is accomplished by a unique structure for a balloon clip fastening device which includes a stand member provided with a V-shaped groove into which a balloon clip is inserted along with an inflated balloon so that the clip is slid towards the end of the groove, thus bringing the clip to close to hold the balloon. The clip which is holding the balloon can be removed from the stand member through a clip receiving hole which is formed in a continuous fashion to the bottom of the V-shaped groove.

With the structure describe above, a V-shaped balloon clip with the stem portion of an inflated balloon placed between the clamping members is brought into the V-shaped groove from an open end of the groove and is pushed toward the other end. By moving the clip within the V-shaped groove, the V-shaped clip is closed by being pushed by the groove walls so as to tightly hold the stem of the balloon. When the thus closed clip is further pushed advance and brought into the clip receiving hole, the clip that holds the balloon can be removed from the clip fastening device by sliding the clip sideways in the receiving hole. Thus, closing of the inflated balloons can be performed quickly, easily and reliably.

DETAILED DESCRIPTION OF THE INVENTION

Figure 5:
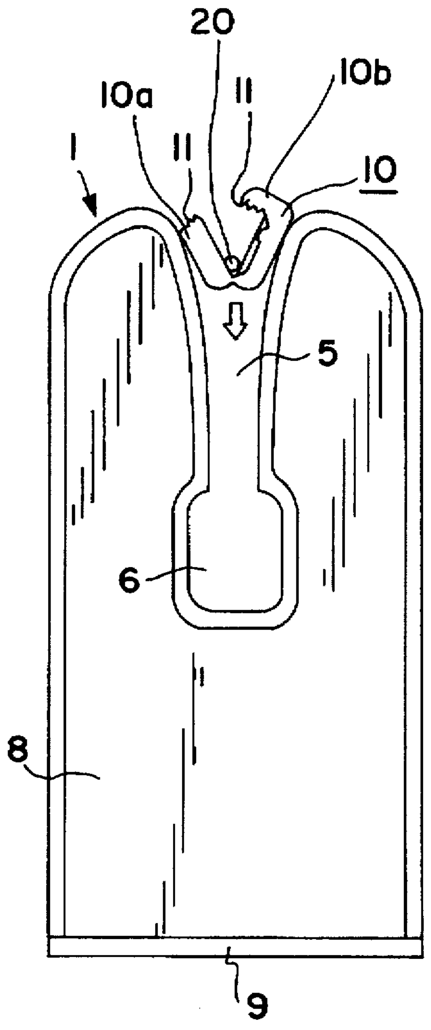
FIG. 5 is an explanatory front view of the device with the balloon clip brought into the opening of the clip fastening device.

As shown in FIG. 5, the balloon clip fastening device 1 of the present invention is comprised of a stand assembly 8 that has a base 9 at the bottom. Thus, the stand assembly 8 can stand by itself on a horizontal plane.

The stand assembly 8 is provided with a V-shaped groove 5 at substantially the center of the stand assembly 8, and the groove 5 extends vertically in FIG. 5. Thus, from one end (the top open end in FIG. 5) of the groove 5, a balloon clip 10 with the stem 20 of an inflated balloon placed between the clamping members **10*a* and 10*b* of the clip 10 is inserted. The V-shaped groove 5 is V-shaped when viewed from the front as shown in FIG. 5** so that the top opening gradually becomes narrower towards the bottom or the lower end of the groove.

Figure 6:
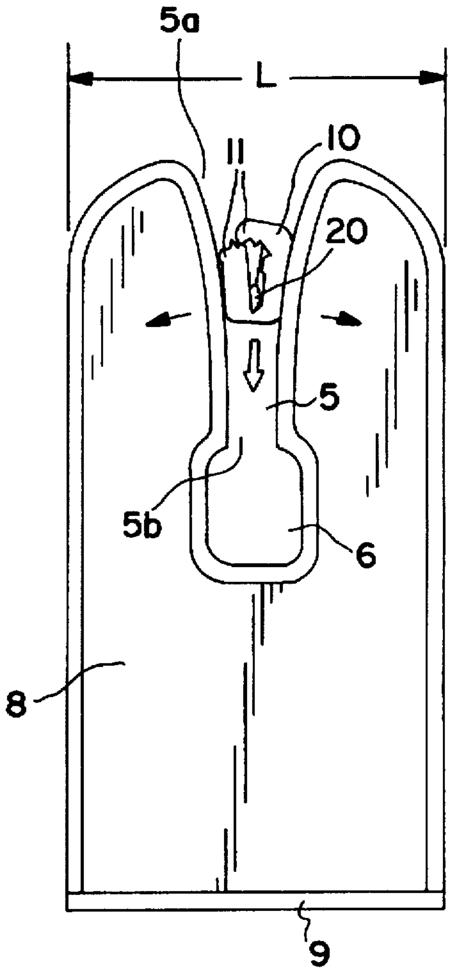
FIG. 6 is an explanatory front view of the device showing the balloon clip pushed halfway in the closing device.
Figure 7:
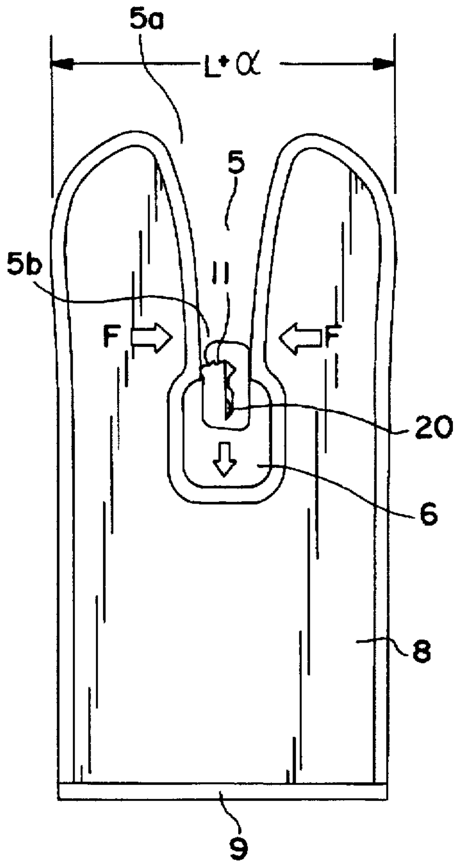
FIG. 7 is an explanatory front view of the device showing the balloon clip in the clip receiving hole of the device.

More specifically, the groove 5 has an open top end **5*a* (see FIG. 6) that is wide enough for receiving an open and V-shaped clip 10, and the groove 5 becomes gradually narrower towards a bottom 5*b* of the groove 5 so that the open clip is closed while it is moved in the groove 5 from the open top end 5*a* to the bottom 5*b* (see FIG. 7). Thus, the middle and the bottom portions of the groove 5 has a width in which the closed clip can be moved with the outer surfaces of the clip 10 in touch with the inside wall surface of the groove 5**.

The stand assembly 8 is further provided with a clip receiving hole 6. The clip receiving hole 6 is located at another end (or the lower or bottom end **5*b*) of the V-shaped groove 5 in a manner that the receiving hole 6 is continuous to the V-shaped groove 5. In other words, the bottom 5*b* of the guide groove 5 opens into the clip receiving hole 6. The clip receiving hole 6 is slightly larger in size as seen in FIG. 7 than the clip which has been closed so that the closed clip 20 is somewhat loose in the hole 6, so that it can be pushed sideways and then taken out of the receiving hole 6**.

As shown in FIGS. 1 through 4, a guide projection 4 is formed in the direction of depth of the groove 5. More specifically, the guide projection 4 extends from the open top end **5*a* to the open bottom end 5*b* of the V-shaped groove 5. The guide projection 4 is formed on one edge of the facing two inside wall surfaces of the V-shaped groove 5. The guide projection 4 is to guide the balloon clip 10 to the bottom of the groove (in the Figures) without falling out of the groove 5 while it is being moved inside the groove 5. As seen from FIGS. 2 and 4, the guide projections 4 project toward each other inside the groove 5, and they are on the opposite-side edge portion of the inside wall surface of the groove 5**.

With the guide projections 4, the balloon clip 10 being inserted into the V-shaped groove 5 and pushed by hands toward the bottom of the V-shaped groove 5 is prevented from moving sideways. In addition, the guide projections 4 are effective from a safety standpoint for preventing accidents such as injuries to workers, etc. when fingers are caught in the groove 5.

In the shown embodiment, only one guide projection 4 is formed on each of the inside wall surfaces of the V-shaped groove 5 so that the guide projections 4 are on the opposite-side edges of the inner surfaces of the groove 5. Thus, the guide projections 4 do not face each other across the V-shaped groove 5. It would, however, be possible to form the guide projections 4 on both edges of each inside wall surface of the V-shaped groove 5.

The clip receiving hole 6 is continuous to and communicates with the bottom **5*b* of the V-shaped groove 5. Thus, the clip 10 which is pushed and slid in the groove 5 so as to be closed enters into the clip receiving hole 6, which is larger than the closed clip 10 and removed from the stand assembly 8 is easy by being pushed sideways. The clip receiving hole 6** can be in any shape including square and round.

The stand assembly 8 which has the V-shaped groove 5 and the receiving hole 6 are formed from either plastic or metal. The sliding movement of the balloon clip 10 in the V-shaped groove 5 can be smoother if the stand assembly 8 and therefore the inside wall of the groove 5 are made from an elastic material such as a plastic, etc. Thus, the use of such an elastic material is preferable.

Figure 1:
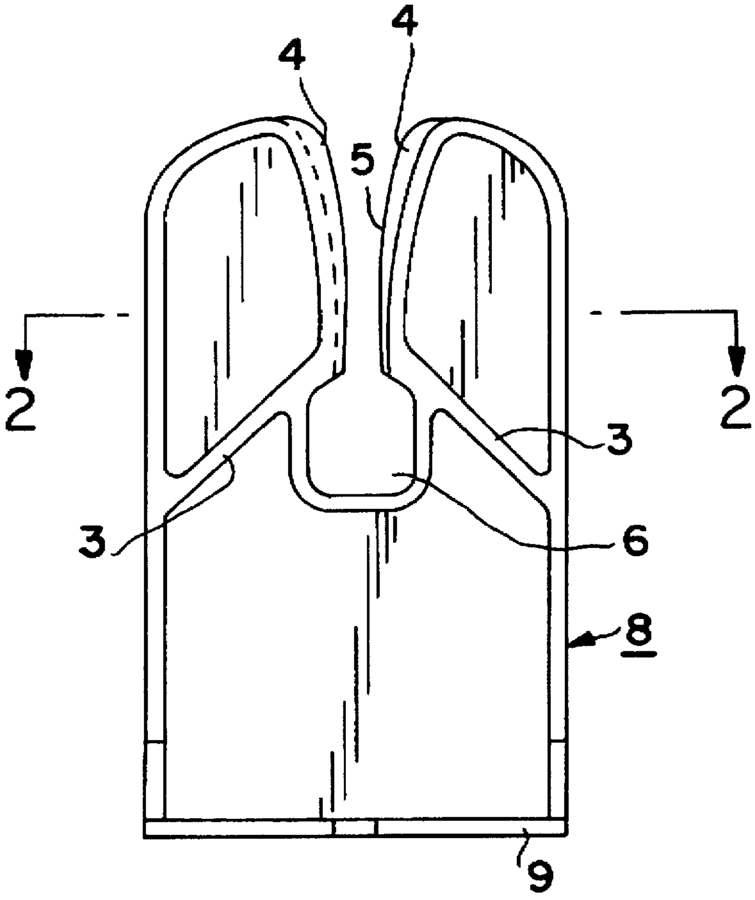
FIG. 1 is a front view of the balloon clip fastening device according to the present invention.
Figure 2:
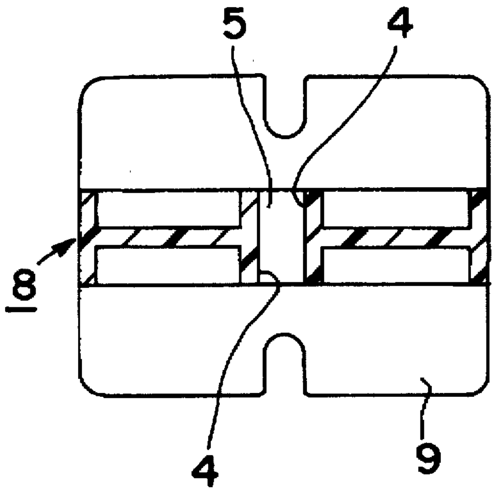
FIG. 2 is cross section taken long the line 2—2 in FIG. 1.
Figure 3:
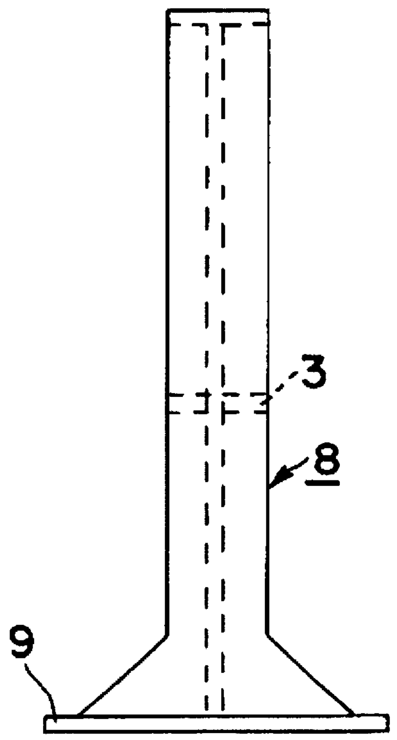
FIG. 3 is a side view of the device shown in FIG. 1.
Figure 4:
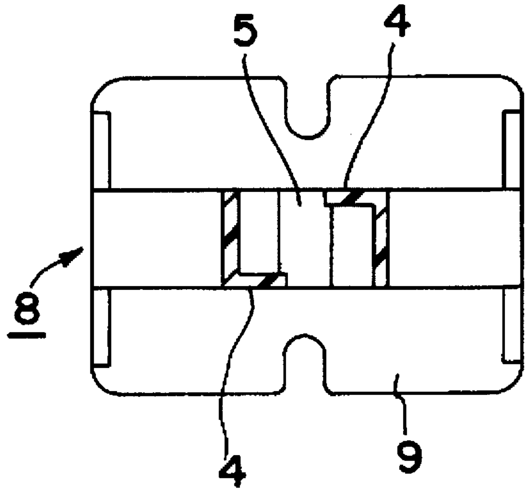
FIG. 4 is a top view thereof.

The inside wall surfaces of the V-shaped groove 5 which contact the balloon clip 10 may be reinforced by forming ribs 3 as shown in FIG. 1. The ribs 3 are made where a maximum stress occurs in the stand assembly 8.

In use, one individual V-shaped balloon clip 10 in which the stem portion 20 of a balloon placed between the clamping members **10*a* and 10*b* is inserted into the V-shaped groove 5 from the top open end 5*a* as shown in FIG. 5. Then, the clip 10 is pushed toward the bottom 5*b* of the groove 5 as shown in FIGS. 6 and 7. In this case, the clip 10 is guided down by pushing, for example, the clamped balloon or merely the stem portion of the balloon. As a result, both tip ends of the clamping members 10 and 10*b* of the clip 10 are pressed together by the inside wall surface of the groove so that engaging parts 11** at the tip of the clamping members are brought to engage with each other, thus closing the balloon tightly.

The balloon clip 10 thus closed enters into the clip receiving hole 6 and removed together with the balloon from the receiving hole 6 by sliding the clip 10 sideways.

Thus, the closing operation of the balloon can be performed smoothly and continuously with good efficiency.

If the stand assembly 8 made of an elastic material is used, the width of the stand assembly 8 can increase slightly from L shown in FIG. 6 to L+a shown in FIG. 7 with a reaction force generated as shown by arrows F in FIG. 7 when the balloon clip 10 is pushed into the V-shaped groove 5. This facilitates the passage of the clamping body 10.

Figure 8:
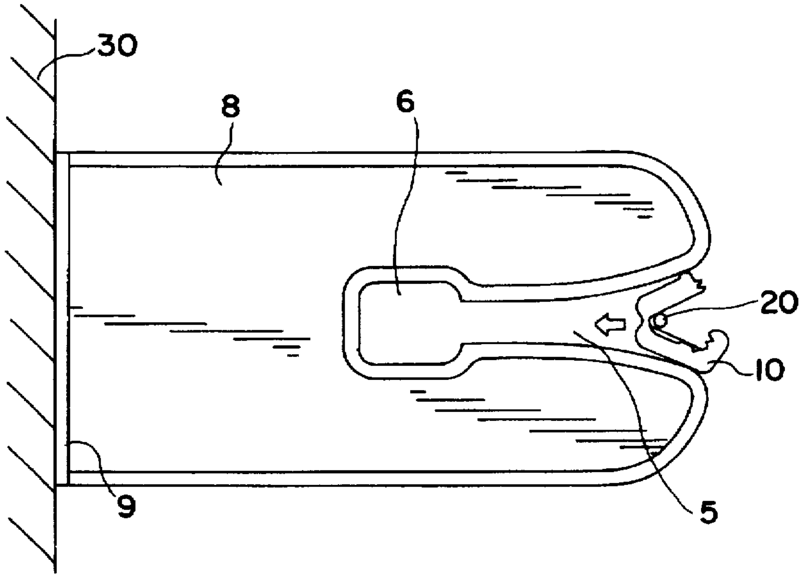
FIG. 8 is a front view of the balloon clip fastening device according to the present invention installed on a vertical wall.

The embodiments above are described for the balloon fastening device disposed vertically with the V-shaped groove extending vertically. However, the V-shaped groove 5 can be formed horizontally in the stand assembly 8 so that the base 9 of the stand assembly 8 is mounted on a vertical wall 30 and the balloon clips are closed when they are moved horizontally as shown in FIG. 8.

As described above, according to the balloon clip fastening device of the present invention, balloons are closed quickly, easily and reliably by individually placing the clip inside the fastening device; and the efficiency of the closing operation is high and the cost of such an operation can be small.

I claim:

1. A balloon clip fastening device comprising a stand assembly which has a V-shaped groove into which a V-shaped balloon clip clamping a stem portion of a balloon is inserted, said V-shaped groove being formed in an upper part of said stand assembly, and said stand assembly being provided with a clip receiving hole formed continuously to a bottom of said V-shaped groove, and wherein a guide projection is formed in a direction of depth of said groove of one edge part of each of two inside wall surfaces of said V-shaped groove with such two facing guides being formed on opposite-side edge parts of said wall surfaces.

2. A balloon clip fastening device according to claim 1, wherein said stand assembly is made of an elastic material.

3. A balloon clip fastening device according to claim 2, wherein said elastic material is plastic.

4. A balloon clip fastening device according to claim 1, wherein inside wall surfaces of said V-shaped groove which contact said balloon clip are reinforced by ribs which are formed where maximum stress occurs in said stand assembly.

* * * * *